United States Patent
Purnadi et al.

(10) Patent No.: US 9,055,517 B2
(45) Date of Patent: Jun. 9, 2015

(54) SYSTEM AND METHOD OF USER-DIRECTED DYNAMIC DOMAIN SELECTION

(75) Inventors: Rene W. Purnadi, Coppell, TX (US); M. Khaledul Islam, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 1348 days.

(21) Appl. No.: 11/679,032

(22) Filed: Feb. 26, 2007

(65) Prior Publication Data

US 2008/0205386 A1    Aug. 28, 2008

(51) Int. Cl.
| | |
|---|---|
| H04W 4/00 | (2009.01) |
| H04W 48/18 | (2009.01) |
| H04W 80/04 | (2009.01) |
| H04W 76/02 | (2009.01) |

(52) U.S. Cl.
CPC .............. *H04W 48/18* (2013.01); *H04W 80/04* (2013.01); *H04W 76/022* (2013.01)

(58) Field of Classification Search
CPC .................................................... H04W 4/00
USPC ............... 455/445, 433, 466, 404.2, 435.1, 7, 455/432.1, 411; 370/352, 328, 356, 353, 370/395.54, 389, 342, 338, 331; 379/88.18
See application file for complete search history.

(56) References Cited

U.S. PATENT DOCUMENTS

| | | | |
|---|---|---|---|
| 6,304,565 B1 | 10/2001 | Ramamurthy | |
| 6,307,845 B1 * | 10/2001 | Hummelgren et al. | ....... 370/328 |
| 6,567,667 B1 * | 5/2003 | Gupta et al. | ................... 455/445 |
| 6,681,105 B1 | 1/2004 | Balbi | |
| 6,781,983 B1 | 8/2004 | Armistead | |
| 6,785,256 B2 | 8/2004 | O'Neill | |
| 6,937,704 B1 * | 8/2005 | Meijer et al. | ............... 379/88.18 |
| 7,010,299 B2 | 3/2006 | Wilson | |
| 7,139,263 B2 | 11/2006 | Miller et al. | |
| 7,151,931 B2 | 12/2006 | Tsao et al. | |
| 7,197,560 B2 | 3/2007 | Caslin et al. | |
| 7,546,125 B2 | 6/2009 | Sharma et al. | |
| 7,885,208 B2 | 2/2011 | Mutikainen et al. | |
| 7,948,968 B2 | 5/2011 | Voit et al. | |
| 7,995,466 B2 | 8/2011 | Baker et al. | |
| 8,150,393 B2 | 4/2012 | Mayer et al. | |
| 8,462,637 B1 | 6/2013 | Baldwin et al. | |

(Continued)

FOREIGN PATENT DOCUMENTS

| | | |
|---|---|---|
| KR | 20010030725 A | 4/2001 |
| KR | 20050012255 A | 1/2005 |

(Continued)

OTHER PUBLICATIONS

Purnadi, Rene W., et al.; U.S. Appl. No. 11/679,044, filed Feb. 26, 2007; Final Office Action dated Jan. 6, 2010; 15 pgs.

(Continued)

*Primary Examiner* — Kiet Doan
(74) *Attorney, Agent, or Firm* — Conley Rose, P.C.; J. Robert Brown, Jr.

(57) ABSTRACT

A mobile device configured for communication in both packet and circuit switched domains. The mobile device includes a domain selector. The domain selector is configured, responsive to selection by a user of one of the packet switched and circuit switched domains, to promote mobile device communication via the selected one of the packet switched and circuit switched domains.

19 Claims, 7 Drawing Sheets

(56) References Cited

U.S. PATENT DOCUMENTS

| | | |
|---|---|---|
| 2002/0024943 A1 | 2/2002 | Karaul et al. |
| 2002/0085516 A1 | 7/2002 | Bridgelall |
| 2003/0134650 A1 | 7/2003 | Sundar et al. |
| 2003/0139180 A1 | 7/2003 | McIntosh et al. |
| 2003/0139184 A1 | 7/2003 | Singh et al. |
| 2003/0152048 A1 | 8/2003 | Soininen et al. |
| 2004/0001474 A1 | 1/2004 | Simelius et al. |
| 2004/0032865 A1 | 2/2004 | Kwon |
| 2004/0051900 A1 | 3/2004 | Sagiya et al. |
| 2004/0139230 A1 | 7/2004 | Kim |
| 2004/0161086 A1 | 8/2004 | Buntin et al. |
| 2004/0249951 A1 | 12/2004 | Grabelsky et al. |
| 2004/0264410 A1 | 12/2004 | Sagi et al. |
| 2005/0018659 A1 | 1/2005 | Gallant et al. |
| 2005/0021872 A1 | 1/2005 | Poustchi et al. |
| 2005/0025134 A1 | 2/2005 | Armistead |
| 2005/0030928 A1 | 2/2005 | Virtanen et al. |
| 2005/0033852 A1 | 2/2005 | Tenhunen |
| 2005/0041640 A1 | 2/2005 | Nasielski et al. |
| 2005/0047398 A1* | 3/2005 | Yeom .................. 370/352 |
| 2005/0083899 A1 | 4/2005 | Babbar et al. |
| 2005/0083909 A1 | 4/2005 | Kuusinen et al. |
| 2005/0117576 A1 | 6/2005 | McDysan et al. |
| 2005/0154793 A1 | 7/2005 | Khartabil |
| 2005/0163078 A1 | 7/2005 | Oba et al. |
| 2005/0190747 A1 | 9/2005 | Sindhwani et al. |
| 2005/0195762 A1 | 9/2005 | Longoni et al. |
| 2005/0220079 A1 | 10/2005 | Asokan |
| 2005/0238041 A1 | 10/2005 | Hsu et al. |
| 2005/0238158 A1 | 10/2005 | Nguyen et al. |
| 2005/0265284 A1 | 12/2005 | Hsu et al. |
| 2006/0068778 A1 | 3/2006 | Della-Torre |
| 2006/0094396 A1 | 5/2006 | Raghuram et al. |
| 2006/0116127 A1 | 6/2006 | Wilhoite et al. |
| 2006/0121916 A1 | 6/2006 | Aborn et al. |
| 2006/0159059 A1 | 7/2006 | Vaittinen et al. |
| 2006/0209794 A1 | 9/2006 | Bae et al. |
| 2006/0230161 A1 | 10/2006 | Bae et al. |
| 2006/0253538 A1 | 11/2006 | Jung et al. |
| 2006/0268840 A1 | 11/2006 | Xu et al. |
| 2006/0276192 A1 | 12/2006 | Dutta et al. |
| 2006/0280169 A1 | 12/2006 | Mahdi |
| 2006/0286984 A1 | 12/2006 | Bonner |
| 2006/0291419 A1 | 12/2006 | McConnell et al. |
| 2006/0291639 A1 | 12/2006 | Radziewicz et al. |
| 2007/0015510 A1 | 1/2007 | Xiang |
| 2007/0022200 A1 | 1/2007 | Benkert et al. |
| 2007/0022289 A1 | 1/2007 | Alt et al. |
| 2007/0049281 A1* | 3/2007 | Chen et al. .................. 455/445 |
| 2007/0072595 A1 | 3/2007 | Pi et al. |
| 2007/0116234 A1 | 5/2007 | Schneider et al. |
| 2007/0117588 A1 | 5/2007 | Uehara et al. |
| 2007/0118662 A1 | 5/2007 | Vishwanathan et al. |
| 2007/0121502 A1 | 5/2007 | Donovan et al. |
| 2007/0133519 A1 | 6/2007 | Florkey et al. |
| 2007/0174905 A1 | 7/2007 | Martherus et al. |
| 2007/0183394 A1 | 8/2007 | Khandelwal et al. |
| 2007/0183410 A1 | 8/2007 | Song et al. |
| 2007/0201403 A1 | 8/2007 | Thome |
| 2007/0226361 A1 | 9/2007 | Shaikh et al. |
| 2007/0263599 A1 | 11/2007 | Itzkovitz et al. |
| 2008/0029080 A1 | 2/2008 | Dodo |
| 2008/0037481 A1 | 2/2008 | Chiang et al. |
| 2008/0037518 A1 | 2/2008 | Kumarasamy et al. |
| 2008/0049675 A1 | 2/2008 | Burgan et al. |
| 2008/0056236 A1 | 3/2008 | Barclay et al. |
| 2008/0102844 A1 | 5/2008 | Zhu et al. |
| 2008/0112392 A1* | 5/2008 | Mansfield .................. 370/352 |
| 2008/0119165 A1 | 5/2008 | Mittal et al. |
| 2008/0186953 A1 | 8/2008 | Buckley et al. |
| 2008/0198764 A1 | 8/2008 | Keller |
| 2008/0305793 A1 | 12/2008 | Gallagher et al. |
| 2009/0156215 A1 | 6/2009 | Pitkamaki |
| 2009/0185554 A1 | 7/2009 | Provenzale et al. |
| 2009/0233600 A1 | 9/2009 | Johansson et al. |
| 2009/0268712 A1 | 10/2009 | Bottiero et al. |
| 2009/0323623 A1 | 12/2009 | Julka et al. |
| 2010/0110978 A1 | 5/2010 | Falkena et al. |
| 2010/0157995 A1 | 6/2010 | Bigalke et al. |

FOREIGN PATENT DOCUMENTS

| | | |
|---|---|---|
| KR | 20060013951 A | 2/2006 |
| KR | 20070067234 A | 6/2007 |
| WO | 2005051025 A1 | 6/2005 |
| WO | 2006057924 A2 | 6/2006 |
| WO | 2007009348 A1 | 1/2007 |
| WO | 2007079578 A1 | 7/2007 |

OTHER PUBLICATIONS

Purnadi, Rene W., et al.; U.S. Appl. No. 11/679,044, filed Feb. 26, 2007; Office Action dated May 13, 2009; 20 pgs.

EP Examination Report; EP Patent Application No. 07108763.9; Feb. 3, 2009; 3 pgs.

PCT International Search Report; PCT Application No. PCT/CA2008/000072; Apr. 29, 2008; 3 pgs.

PCT Written Opinion of the International Searching Authority; PCT Application No. PCT/CA2008/000072; Apr. 29, 2008; 5 pgs.

European Search Report; EP Application No. 07108763.9; Sep. 25, 2007; 7 pgs.

3GPP TS 24.008v7.6.0; 3rd Generation Partnership Project; Technical Specification Group Core Network and Terminals; Mobile Radio Interface Layer 3 Specification; Core Network Protocols; Stage 3; Dec. 2006; 539 pgs.

Jones, Dan, Unstrung News Analysis; Cisco, Nokia Team on FMC; Apr. 27, 2006; 2 pgs.

Nobel, Carmen, Unstrung News Analysis; Cisco/Moto Deal Dies; Apr. 26, 2006; 2 pgs.

Jones, Dan, Unstrung News Analysis; Cisco Speaks Enterprise; Apr. 25, 2006; 4 pgs.

News Wire Feed; Moto, Cisco Go Dualmode; Jul. 26, 2005; 2 pgs.

Springham, Justin; Moto Ramps Up Convergence; May 10, 2005; 2 pgs.

PCT International Search Report; PCT Application No. PCT/CA2008/000280; May 22, 2008; 3 pgs.

PCT Written Opinion of the International Searching Authority; PCT Application No. PCT/CA2008/000280; May 22, 2008; 4 pgs.

3rd Generation Partnership Project; "Technical Specification Group Services and System Aspects, Voice Call Continuity (VCC) between Circuit Switched (CS) and IP Multimedia Subsystem (IMS)"; Stage 2; 3GPP TS 23.206 v7.1.0; Dec. 2006, 35 pgs.

3rd Generation Partnership Project; "Technical Specification Group Core Network and Terminals, Voice Call Continuity between the Circuit-Switched (CS) domain and the IP Multimedia Core Network (CN) (IMS) Subsystem"; Stage 3; 3GPP TS 24.206 v7.0.1; Jan. 2007; 112 pgs.

3rd Generation Partnership Project; "Technical Specification Group Service and Architecture, Optimisations and Enhancements for Realtime IMS Communication"; 3GPP TR 23.818 v0.9.0; Jan. 2007; 66 pgs.

European Search Report; EP Application No. 07108761.3; Oct. 4, 2007; 7 pgs.

Foreign Communication From a Counterpart Application; EP Application No. 07108763.9; Examination Report Dated Nov. 3, 2010; 3 pgs.

Purnadi, Rene W., et al.; U.S. Appl. No. 11/679,044; Title: System and Method to Trigger a Mobile Device in Different Domains Based on Unsuccessful Initialization or Handover; filed Feb. 26, 2007.

Buckley, Adrian; U.S. Appl. No. 11/837,273; Title: Systems and Methods for Defining Mult-Domain Wireless Device Bahvior for Two or More Calls; filed Aug. 10, 2007.

3GPP TS 23.206 v7.2.0; 3rd Generation Partnership Project; Technical Specification Group Services and System Aspects; Voice Call Continuity (VCC) between Circuit Switched (CS) and IP Multimedia Subsystem (IMS); Stage 2; Mar. 2007; 36 pages.

3GPP TS 24.229 v6.0.0; 3rd Generation Partnership Project; Technical Specification Group Core Network; IP Multimedia Call Control Protocol based on Session Initiation Protocol (SIP) and Session

(56) References Cited

OTHER PUBLICATIONS

Description Protocol (SDP); Stage 3, Release 6; Sep. 2003; 257 pages.
3GPP TSG SA WG2 #50, Research in Motion, "NeDS Routing Decision Based on Operator and User Policy," Jan. 16-20, 2006, S2-060092, Budapest, Hungary, 3 pages.
3GPP TSG-SA WG2 Meeting #46, Ericsson, "Service Continuity—Network Domain Selection", Tdoc S2-050995, Athens, Greece, May 9-13, 2005, 2 pages.
3GPP TSG SA WG2 Architecture—S2#51, LG Electronics, RIM, "VCC Transmission of User Preferences and Operator Policy," Feb. 13-17, 2006, S2-060950, Denver, Colorado, 2 pages.
Office Action dated May 12, 2010; U.S. Appl. No. 11/679,044, filed Feb. 26, 2007; 22 pages.
Office Action dated Jan. 7, 2011; U.S. Appl. No. 11/679,044, filed Feb. 26, 2007; 21 pages.
Notice of Allowance dated Mar. 24, 2011; U.S. Appl. No. 11/679,044, filed Feb. 26, 2007; 11 pages.
Office Action dated Feb. 19, 2010; U.S. Appl. No. 11/837,273, filed Aug. 10, 2007; 16 pages.
Final Office Action dated Aug. 18, 2010; U.S. Appl. No. 11/837,273, filed Aug. 10, 2007; 11 pages.
Office Action dated Nov. 10, 2010; U.S. Appl. No. 11/837,273, filed Aug. 10, 2007; 8 pages.
Korean Office Action; Notice Requesting Submission of Opinion; Korean Application No. 10-2009-7019794; Mar. 8, 2011; 7 pages.
International Preliminary Report on Patentability; PCT Application No. PCT/CA2008/000072; Jun. 12, 2008; 10 pages. (4214-00202).
Korean Office Action; Notice Requesting Submission of Opinion; Korean Application No. 10-2009-7019363; Mar. 17, 2011; 6 pages. (4214-00207).
European Search Report; EP Application No. 07115354.8; Dec. 27, 2007; 9 pages. (4214-02601).
European Search Report; EP Application No. 07115354.8; Nov. 3, 2008; 5 pages. (4214-02601).
EP Examination Report; EP Patent Application No. 07115354.8; Sep. 2, 2010; 4 pages.
PCT International Search Report, PCT Application No. PCT/US2008/069814; Jan. 9, 2009; 3 pages.
PCT Written Opinion of the International Searching Authority, PCT Application No. PCT/US2008/069814; Jan. 9, 2009; 8 pages.
International Preliminary Report on Patentability, PCT Application No. PCT/US2008/069814; Nov. 27, 2009; 5 pages.
Final Office Action dated Apr. 13, 2012; U.S. Appl. No. 12/169,905, filed Jun. 27, 2011; 13 pages.
Final Office Action dated Mar. 1, 2012; U.S. Appl. No. 11/837,273, filed Aug. 10, 2007; 15 pages.
Advisory Action dated May 22, 2012; U.S. Appl. No. 11/837,273, filed Aug. 10, 2007; 3 pages.
Office Action dated Nov. 7, 2011; U.S. Appl. No. 12/169,905, filed Jun. 27, 2011; 23 pages.
Chinese Office Action; Application No. 200880006126.2; Sep. 26, 2011; 10 pages.
Notice of Allowance dated Apr. 29, 2011; U.S. Appl. No. 11/679,044, filed Feb. 26, 2007; 16 pages.
Final Office Action dated May 26, 2011; U.S. Appl. No. 11/837,273, filed Aug. 10, 2007; 21 pages.
EP Decision to Grant; EP Application No. 07108761.3; Mar. 31, 2011; 2 pages.
PCT International Preliminary Report on Patentability; PCT Application No. PCT/CA2008/000280; Aug. 26, 2009; 5 pages.
Office Action dated Jul. 19, 2012; U.S. Appl. No. 11/837,273, filed Aug. 10, 2007; 23 pages.
Korean Office Action; Application No. 10-2012-70120444; Jun. 26, 2012; 7 pages.
Purnadi, Rene W., et al.; U.S. Appl. No. 13/169,906; Title: Title: System and Method to Trigger a Mobile Device in Different Domains Based on Unsuccessful Initialization or Handover; filed Jun. 27, 2011.
Office Action dated Aug. 10, 2011; U.S. Appl. No. 11/837,273, filed Aug. 10, 2007; 11 pages.
EP Examination Report; EP Patent Application No. 07108763.9; Jul. 11, 2008; 3 pages.
EP Decision to Grant; EP Application No. 07108763.9; Mar. 17, 2011; 4 pages.
Canadian Office Action; Application No. 2,677,682; Aug. 9, 2011; 3 pages.
Chinese Office Action; Application No. 200880006063.0; Jul. 26, 2011; 12 pages.
Canadian Office Action; Application No. 2,677,720; Sep. 24, 2012; 3 pages.
Canadian Office Action; Application No. 2,696,001; Oct. 26, 2012; 3 pages.
Final Office Action dated Jan. 16, 2013; U.S. Appl. No. 11/837,273, filed Aug. 10, 2007; 15 pages.
Korean Office Action; Application No. 10-2012-70120444; Dec. 18, 2012; 5 pages.
EP Examination Report; EP Patent Application No. 07108761.3; Jan. 30, 2009; 4 pgs.
Korean Office Action; Application No. 10-2012-7022419; Apr. 15, 2013; 8 pages.
Chinese Office Action; Application No. 200880006063.0; Mar. 14, 2013; 8 pages.
Office Action dated Jul. 24, 2013; U.S. Appl. No. 12/169,905, filed Jun. 27, 2011; 36 pages.
Office Action dated Jan. 3, 2014; U.S. Appl. No. 13/169,905, filed Jun. 27, 2011; 21 pages.
Canadian Office Action; Application No. 2,677,720; Nov. 28, 2013; 2 pages.
Indian Office Action; Application No. 4825/CHENP/2009; Dec. 16, 2014; 2 pages.

* cited by examiner

SYSTEM AND METHOD OF USER-DIRECTED DYNAMIC DOMAIN SELECTION

BACKGROUND

Easily transportable devices with wireless telecommunications capabilities, such as mobile telephones, personal digital assistants, handheld computers, and similar devices, will be referred to herein as mobile devices. A communications connection between two mobile devices can be referred to as a call or a session. Some mobile devices communicate in a circuit switched mode, wherein a dedicated communication path exists between two devices. For the duration of a call or session, all data exchanged between the two devices travels along the single path.

Some mobile devices also have the capability to communicate in a packet switched mode. In packet switching, a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include Wireless Local Area Network (WLAN), GPRS, Worldwide Interoperability for Microwave Access (WiMAX), and CDMA 1x EV-DO. Examples of wireless network standards that may use both circuit switching and packet switching modes include CDMA 1x and UMTS. An example of an application-layer protocol that can be used in a packet switching wireless network is the Session Initiation Protocol (SIP). SIP has been standardized and governed primarily by the Internet Engineering Task Force (IETF).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
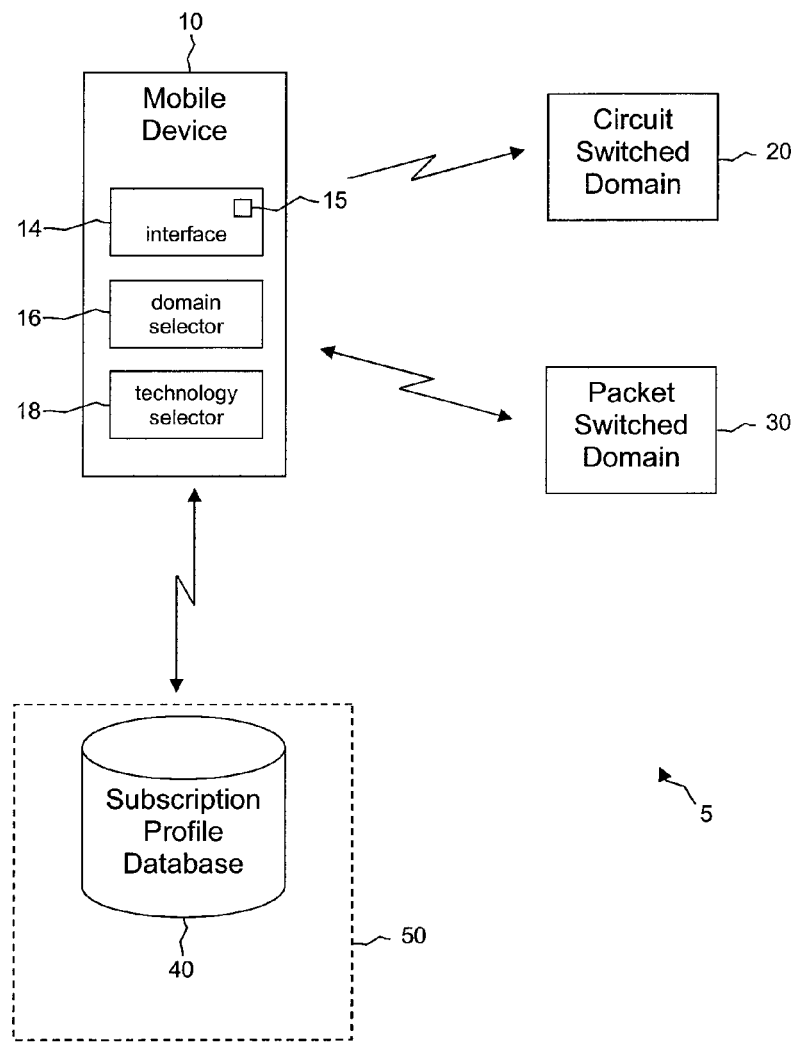
FIG. 1 is a block diagram of a system including a mobile device operable to communicate in the circuit switched domain and in the packet switched domain according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a mobile device is provided that is configured for communication in both packet and circuit switched domains. The mobile device includes a domain selector. The domain selector is configured, responsive to selection by a user of one of the packet switched and circuit switched domains, to promote mobile device communication via the selected one of the packet switched and circuit switched domains.

In another embodiment, a method in a mobile device for selecting a communication domain is provided. The method includes providing a default domain selected from one of a packet switched and circuit switched domains, selecting to override the default domain for a call and to use the other one of the packet switched and circuit switched domains, and communicating via the selected override domain.

In another embodiment, a method for domain selection is provided. The method includes providing a default domain for mobile device communication. The default domain is selected from one of a packet switched domain and a circuit switched domain. The method also includes selecting to override the default domain for a call and to use the other one of the packet switched and circuit switched domains. The method also includes communicating via the selected override domain.

In another embodiment, a system for domain selection is provided. The system includes a packet switched domain, a circuit switched domain, and a mobile device to selectively communicate in the packet and circuit switched domains responsive to user input.

Currently, calls or sessions made in the circuit switched domain tend to be more reliable, provide guaranteed latency and security, and have a higher quality than calls or sessions made in the packet switched domain since each circuit switched call is made over a circuit dedicated exclusively to that call. However, the use of a dedicated circuit tends to make circuit switched calls more expensive than packet switched calls. Packet switched calls, on the other hand, tend to be less expensive because packet switching allows network resources to be shared between multiple calls simultaneously. But packet switched calls tend to be less reliable since the sharing of resources and the disassembling and reassembling of a data stream can lead to errors and significant indeterminate delays resulting in degradation in quality. It should be recognized that in the future these characteristics could reverse and packet switched calls could become more reliable and more expensive while circuit switched calls become less reliable and less expensive.

A mobile device that is capable of communicating in both the circuit switched domain and the packet switched domain can be referred to as a dual domain device or a dual mode device. For current and proposed dual mode devices, a user typically specifies a preference for using a particular domain or a particular network, protocol, or technology within a domain. For example, a user who is willing to pay more for more reliable and secure calls might express a preference for the circuit switched domain or a particular network, protocol, or technology within the circuit switched domain. A user who is willing to tolerate some unreliability and delay in exchange for less expensive calls might express a preference for the packet switched domain or a particular network, protocol, or technology within the packet switched domain.

A user's preference for a particular domain or a particular network, protocol, or technology within a domain will be referred to herein as a connection preference. A user's connection preference may be an item within a set of the user's telecommunications preferences known as a subscription profile. A provider of wireless telecommunications services might store its customers' subscription profiles in a database or similar data store. When a customer attempts to initiate a wireless call or session, the provider typically consults the database to retrieve the customer's subscription profile and determine the user preferences that should be applied to the call. In this way, the connection preference of a user of a dual mode device can be applied to all calls the user makes.

For current and proposed dual mode devices, a user's connection preference remains in effect for all calls the user makes. If the user wishes to use a different domain, network, protocol, or technology, the user would typically change the connection preference in the subscription profile. The service provider would then update the subscription profile in its database. The new connection preference would then remain in effect for all future calls until the user changed the subscription profile again.

In an embodiment, a user of a dual mode device is provided with the capability to dynamically select, on a per call or per session basis, the domain in which the call or session will be initiated. That is, during the initialization of each session, the user is given the opportunity to specify whether the session will be circuit switched or packet switched. The session may be a voice call in some embodiments and a data transfer session in other embodiments.

In an embodiment, the user's preference for circuit switching or packet switching remains in place in the user's subscription profile and this preference is used as a default for each session. If the user wishes to use a domain other than the default for a particular call, the user can make an appropriate input into the mobile device and an attempt to use the other domain will be made for that call. Thus, for each session, the default domain can be used or the default domain can be overridden and the other domain can be used.

As used hereinafter, the terms "select a domain", "designate a domain", and the like will refer to the choice of a domain for a call or session, whether through the acceptance of the default domain or through the overriding of the default. It will be recognized, however, that in the case of the acceptance of the default, no deliberate selection or designation need be made by the user.

In an embodiment, the user selects only the domain for the session, not the network, protocol, or technology within that domain. For example, the user might specify a preference for a circuit switched session but would not specify whether the circuit switched session should use CDMA 1x, GSM, UMTS, or some other circuit switched network, protocol, or technology. Or the user might specify a preference for a packet switched session but would not specify whether the packet switched session should use WLAN, WiMAX, CDMA 1xEV-DO or some other packet switched network, protocol, or technology.

In an embodiment, a dual mode device includes a domain selector that is capable of receiving the user's domain selection and passing the selection to a technology selector in the dual mode device. The technology selector is capable of automatically selecting an appropriate network, protocol, or technology within the domain that the user has selected and causing a session to be initiated in the selected network, protocol, or technology. The technology selector might base its selection on cost, availability, reliability, or other factors. The technology selector is capable of transmitting the user's selected domain to the network to override the user's default domain.

The network is capable of accepting or rejecting the user's selected domain for various reasons such as network resource availability and load balancing. If the domain that the user has selected is unavailable or cannot be used for some other reason, the domain selector might automatically cause the technology selector to automatically select an appropriate network, protocol, or technology within the other domain and initiate the session in the other network, protocol, or technology. Alternatively, the mobile device might inform the user of the unavailability of the selected domain and provide the user with the opportunity to use the other domain for the call. The user might then choose to use the other domain or might choose to cancel the call.

In some embodiments, the domain selector and the technology selector might be a single component rather than separate components. Also, in some embodiments, the domain selector and/or the technology selector might reside in a telecommunications network, a computer network, or in some other location rather than in the mobile device.

FIG. 1 is a block diagram of an embodiment of a system 5 that includes a mobile device 10, a circuit switched domain 20, and a packet switched domain 30. The mobile device 10 is capable of communicating in both the circuit switched domain 20 and the packet switched domain 30. The mobile device 10 includes an interface 14 through which a user of the mobile device 10 can designate whether a call is to be initiated in the circuit switched domain 20 or the packet switched domain 30. The mobile device 10 also includes a domain selector 16 that is capable of receiving the user's domain designation from the interface 14.

In addition, the mobile device 10 includes a technology selector 18 that is capable of receiving the domain designation from the domain selector 16, selecting an appropriate network, protocol, or technology within the selected domain, transmitting the user's selected domain, and initiating a call in the designated network, protocol, or technology. While the domain selector 16 and the technology selector 18 are shown as separate components, in other embodiments the domain selector 16 and the technology selector 18 could be a single component.

The mobile device 10 can communicate with a subscription profile database 40 within a telecommunications network 50 to retrieve a default domain designation. Although the telecommunications network 50, the circuit switched domain 20, and the packet switched domain 30 are shown as separate components, it should be understood that the circuit switched domain 20, the packet switched domain 30, or both could be components within the telecommunications network 50. Alternatively, the telecommunications network 50 could be a component within the circuit switched domain 20, the packet switched domain 30, or both. Also, the telecommunications network 50 and/or the packet switched domain 30 could be components within an IP multimedia subsystem (IMS) framework or could contain an IMS framework. In some embodiments, the domain selector 16 and/or the technology selector 18 might reside in the telecommunications network 50 or in some other location rather than in the mobile device 10.

If the user wished to initiate a call in the default domain, the user would not need to make any inputs into the interface 14 different from or in addition to those that would traditionally be made. The mobile device 10 would simply retrieve the default domain from the memory in the user device or from the subscription profile database 40 and initiate the call in that domain. If the user wished to initiate a call in a domain different from the default domain, however, the user would make an appropriate input into the interface 14. The domain selector 16 would receive the input and inform the technology selector 18 of the selected domain. The technology selector 18 would then automatically select an appropriate network, protocol, or technology within the selected domain and cause the call to be initiated in the designated domain rather than the default domain.

As an example, a user might be willing, in most cases, to accept the possibility of uncertain call quality or reliability in exchange for lower calling costs and might therefore designate the packet switched domain 30 as the default domain. However, when placing a call in which quality and reliability are more important, the user might wish to use the circuit switched domain 20. When placing such a call, the user might make an input into the interface 14 specifying that the call should use the circuit switched domain 20. During the initialization process for the call, the technology selector 18, having received the user's domain selection from the domain selector 16, would select an appropriate network, protocol, or technology within the circuit switched domain 20 and ensure that the call is attempted in that network, protocol, or technology.

As another example, a user might be willing, in most cases, to pay higher fees in order to receive higher call quality or reliability and might therefore designate the circuit switched domain 20 as the default domain. In some cases, however, such a user might prefer to use the packet switched domain 30. For instance, when it is known that a call will last for a long period of time and would therefore be expensive if placed in the circuit switched domain 20, the user might wish to place the call in the packet switched domain 30 in order to save money. When placing such a call, the user might make an input into the interface 14 specifying that the call should use the packet switched domain 30. During the initialization process for the call, the technology selector 18, having received the user's domain selection from the domain selector 16, would select an appropriate network, protocol, or technology within the packet switched domain 30 and ensure that the call is attempted in that network, protocol, or technology.

As yet another example, a user who uses the circuit switched domain 20 as the default domain might wish to make a call in the packet switched domain 30 and might make an appropriate input into the interface 14 to do so. However, if no packet switched network, protocol, or technology were currently available for the call, the technology selector 18 might automatically select an appropriate circuit switched network, protocol, or technology and ensure that the call is attempted in that network, protocol, or technology. Alternatively, if the override domain is selected but is not available, the interface 14 might inform the user of the unavailability of the override domain and provide the user with the opportunity to revert to the default domain for the call. The user might then choose to use the default domain or might choose to cancel the call.

In an embodiment, the setup messages, origination messages, initiation messages, or other messages used to start the connection of a wireless call or session are modified to indicate the user's domain designation. For example, in UMTS, spare bit 3 in the Setup/CM Service Request message can be used to indicate the domain preference. In CDMA 1x, the Service Option field (SERVICE_OPTION) in the Origination message can be extended to indicate the domain preference for the requested service. In SIP, a new domain directive can be introduced in the SIP Request Disposition header to indicate the domain preference. One of skill in the art will recognize other modifications that could be made to these or other messages to indicate a user's preference for a domain.

In an embodiment, when the mobile device 10 transmits such a modified message, the message reaches a network element capable of interpreting the message and taking an appropriate action. That is, the network element can cause a call to be initiated in the domain that is specified in the modified message. In some embodiments, this network element is a call continuity control function/network domain selector (CCCF/NeDS), but in other embodiments might be some other well known component.

The overriding of the default domain might apply to session handover as well as to session initialization, where handover is the transfer of an existing session from one telecommunications zone to another. As used herein, the term "zone" refers to the geographic area served by a traditional wireless telecommunications tower, base station, and related components and/or to the geographic area served by a wireless computer network. In other words, a zone might be an area in which circuit switching is available, an area in which packet switching is available, or an area in which both are available. As a mobile device user moves from one zone to another, control of an existing session can be handed over from a circuit switched domain in the first zone to a circuit switched domain in the second zone or from a packet switched domain in the first zone to a packet switched domain in the second zone.

In an embodiment, when a user of the mobile device 10 designates that an override of the default domain designation should occur for a call, the user's preference for an override can be stored and recalled as needed when a handover occurs. The preference might be stored in the network element that received and interpreted the modified initiation message, in the domain selector 16, in the technology selector 18, or elsewhere.

For instance, in the example described above where the user expressed a preference for packet switching for a call but no packet switched network, protocol, or technology was available, the call reverted to circuit switching. If a handover of the call occurred and a packet switched network, protocol, or technology was available during the handover, the network element, the domain selector 16, or the technology selector 18 might cause the call to be handed over to the packet switched domain in accordance with the user's previous wishes.

While the above discussion has focused on calls or sessions initiated by a user of the mobile device 10, similar considerations could apply to calls received by the user. That is, when the mobile device 10 receives an incoming call, the user might make an appropriate input into the interface 14 in order to accept the call in the circuit switched domain 20 or the packet switched domain 30. As with outgoing calls, a default domain for incoming calls might be retained in the subscription profile database 40 and might be used when the user does not select a different domain for an incoming call. If the user wishes to use a domain other than the default, the domain selector 16 can receive an override input entered into the interface 14 and cause the technology selector 18 to connect the incoming call in a network, protocol, or technology within the domain specified in the override input.

The interface 14 might include one or more input components 15, such as buttons or other well known input mechanisms, that allow the user to easily select whether the default domain should be overridden for a particular call. In the case where the input component 15 is a button, the button might include a label or other symbol to indicate its function. However, one of skill in the art will recognize that many users of a dual mode device may be unfamiliar with the concepts of circuit switching and packet switching. If the label on the button displayed options such as "circuit switched" or "packet switched", such users may not know which option to choose. The users may be aware that two options are available, each having advantages and disadvantages, but may be unaware of which option corresponds to which set of advantages and disadvantages.

Other users may be aware of the advantages and disadvantages of the circuit switched domain and the packet switched domain but may forget which domain has been selected as the default. If the label on the button simply stated "override default" or similar wording, such users may not know whether or not to select the button. One of skill in the art will recognize other situations in which the labeling on the button might cause confusion or might not provide sufficient information to users of a dual mode device.

In an embodiment, the button or other input component 15 on the interface 14 is labeled in such a manner that users who are unfamiliar with the concepts of circuit switching and packet switching can easily make an appropriate decision regarding the selection of a domain for a call. In one example, the interface 14 is a touch sensitive liquid crystal diode (LCD) screen and the button is a portion of the screen. In this case, the label on the button can include LCD-based words or symbols that can easily be changed when the function of the button changes.

For instance, if circuit switching has been chosen as the default domain for the mobile device 10, the button could allow packet switching to be selected on a per call basis. The label on the button might then display wording such as "low cost", "lower quality", or similar words or symbols to indicate the packet switching-related parameters the user can expect for the call that is about to be placed. On the other hand, if packet switching has been chosen as the default domain, the button could allow circuit switching to be selected on a per call basis. The label on the button might then display wording such as "high quality", "higher cost", or similar words or symbols to indicate the circuit switching-related parameters the user can expect.

In other embodiments, temporary labels might be applied to the button in other ways. Alternatively, the button might have a more permanent label that describes its function more broadly. For example, the button might have wording such as "alternate domain", "other network", or similar labels to indicate that pressing the button will cause the default domain to be overridden.

In still other embodiments, the input component 15 might not be a button but might be some other input apparatus that allows the user to override the default domain. For example, the input component 15 might be a popup window, dialog box, or similar temporary display that appears on the interface 14 when the user initiates a call. The display could inform the user of the default domain that is in effect and the advantages and disadvantages of the default domain and the other domain. Such an input component 15 might ask the user if an override is desired and might accept a response from the user. One of skill in the art will recognize other ways in which the interface 14 might provide one or more user-friendly input components 15 for overriding the default domain.

In other embodiments, the interface 14 might provide additional information to assist the user in selecting a domain. For example, the interface 14 might display the bandwidth, throughput, or other call quality parameters likely to be available for a call in the circuit switched and packet switched domains. The interface 14 might also display the fees likely to be charged for a call in the circuit switched and packet switched domains. The user might then take this information into account when deciding whether to accept the default domain or select the override domain.

Figure 2:
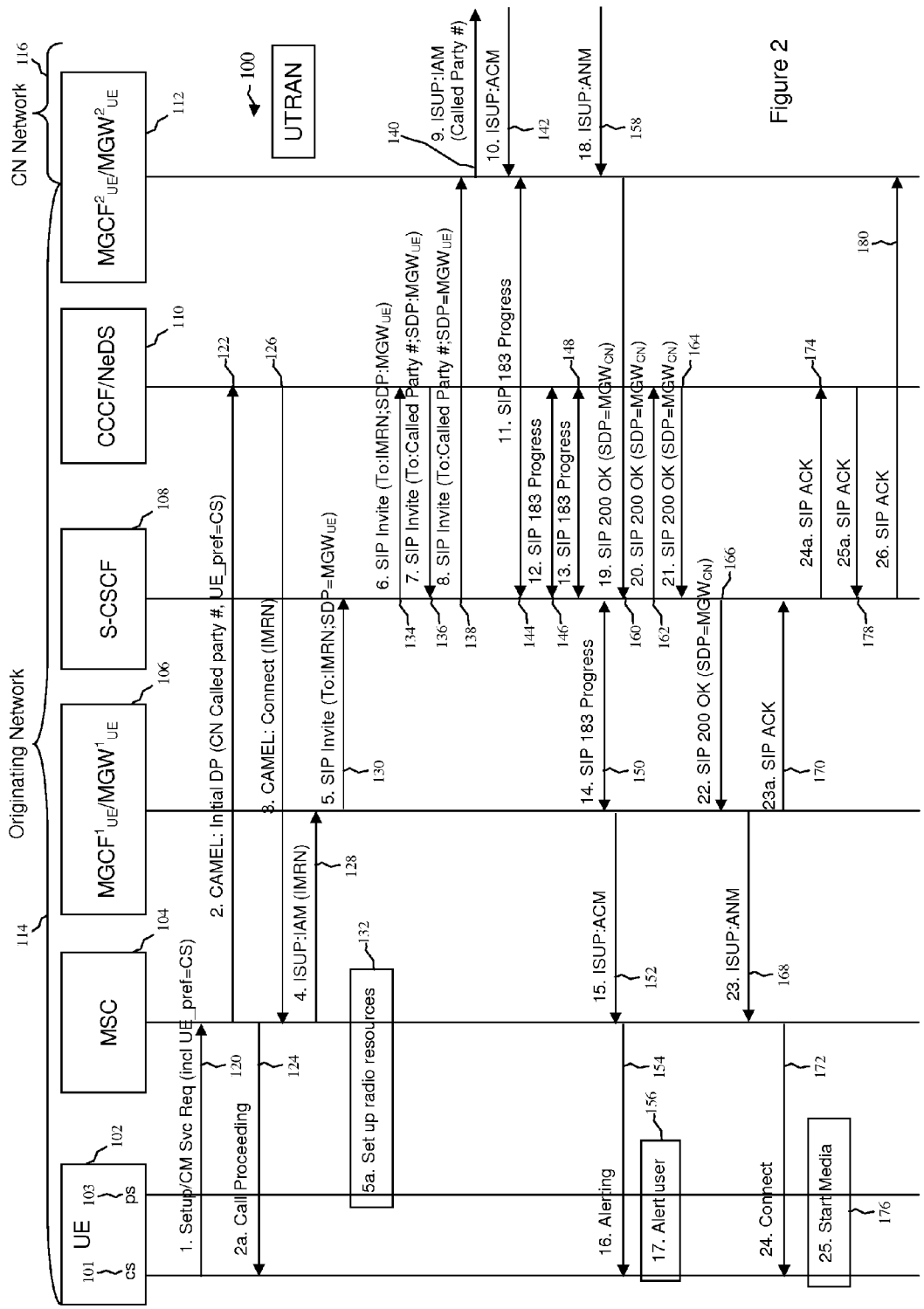
FIG. 2 is a call flow diagram for a call that is preferred to be initiated in the circuit switched domain according to an embodiment of the disclosure.

FIG. 2 is a call flow diagram 100 depicting an example of a series of events that might occur when a user specifies a preference for a call to be attempted in the circuit switched domain. In this case, the protocol that the technology selector 18 of FIG. 1 uses to attempt the call in the circuit switched domain is UTRAN, but other circuit switched protocols could be used in other situations. In the diagram, a mobile device is referred to as user equipment (UE) 102. The UE 102 is capable of operating in either the circuit switched domain or the packet switched domain and therefore has a circuit switched portion 101 and a packet switched portion 103. Other components involved in the call include a mobile switching center (MSC) 104, a first media gateway control function/media gateway (MGCF/MGW) 106, a serving call session control function (S-CSCF) 108, a call continuity control function/network domain selector (CCCF/NeDS) 110, and a second MGCF/MGW 112.

The first MGCF/MGW 106 and the second MGCF/MGW 112 translate messages between the circuit switched domain and the packet switched domain. The S-CSCF 108 is a packet switching-based component that can be considered a SIP server. The CCCF/NeDS 110 is a component in which a call that might use either the circuit switched domain or the packet switched domain can be anchored. The functional entities in the CCCF/NeDS 110 may include the following: Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D), which form a "VCC (Voice Call Continuity) Application".

The UE 102, the MSC 104, the first MGCF/MGW 106, the S-CSCF 108, and the CCCF/NeDS 110 can be considered part of an originating network 114. That is, a calling party might attempt to place a call through the components in the originating network 114. The second MGCF/MGW 112, together with other components not shown, might be part of a corresponding node (CN) network 116. That is, the CN network 116 is the terminating network or the network through which a called party might receive a call.

At event 120, the circuit switched portion 101 of the UE 102 begins the initiation of a call by sending a Setup message to the MSC 104. The Setup message includes a designation of the circuit switched domain as the preferred domain. At event 122, the MSC 104 sends a Customized Applications for Mobile network Enhanced Logic (CAMEL) initialization message to the CCCF/NeDS 110, requesting a connection to the called party. The CAMEL initialization message also includes a designation of the circuit switched domain as the preferred domain. The CCCF/NeDS 110 promotes the selection of the domain in which the call will be attempted based on this user preference.

At event 124, the MSC 104 sends a message to the circuit switched portion 101 of the UE 102 indicating that the call is proceeding. At event 126, the CCCF/NeDS 110 sends a CAMEL Connect (IMRN) (IP (internet protocol) multimedia routing number) message to the MSC 104 indicating that the call will be anchored at the CCCF/NeDS 110 and that the user's selected domain has been accepted. The first MGCF/MGW 106 then, at event 128, sends an IS (Integrated Services Digital Network) User Part: Initial Address Message (ISUP: IAM message) to the MSC 104.

The first MGCF/MGW 106 sends a SIP Invite message to the S-CSCF 108 at event 130. At event 132, the radio resources needed to carry out the call are set up. SIP Invite messages are then exchanged between the S-CSCF 108 and the CCCF/NeDS 110 at events 134 and 136. At event 138, the S-CSCF 108 sends a SIP Invite message to the second MGCF/MGW 112. The second MGCF/MGW 112 sends an ISUP: IAM message to the CN network 116 at event 140 and the CN network 116 responds with an ISUP: ACM (Address Complete) message at event 142. At event 144, the S-CSCF 108 exchanges a SIP Progress message with the second MGCF/MGW 112. At events 146 and 148, SIP Progress messages are exchanged between the S-CSCF 108 and the CCCF/NeDS 110. At event 150, a SIP Progress message is exchanged between the S-CSCF 108 and the first MGCF/MGW 106.

At event 152, the first MGCF/MGW 106 sends an ISUP: ACM message to the MSC 104. The MSC 104 then sends an alerting message to the circuit switched portion 101 of the UE 102 at event 154. The user of the UE 102 is then alerted at event 156. The alert is typically a ring back tone or similar signal to indicate that the called party's device is ringing. At event 158, the CN network 116 sends an ISUP: ANM (Answer Message) message to the second MGCF/MGW 112. The second MGCF/MGW 112 sends a SIP OK message to the S-CSCF 108 at event 160. SIP OK messages are then exchanged between the S-CSCF 108 and the CCCF/NeDS 110 at events 162 and 164. The S-CSCF 108 sends a SIP OK message to the first MGCF/MGW 106 at event 166.

At event 168, the first MGCF/MGW 106 sends an ISUP: ANM message to the MSC 104 indicating that the called party has answered. The first MGCF/MGW 106 then sends a SIP Acknowledgement message to the S-CSCF 108 at event 170. At event 172, a connection message is sent from the MSC 104 to the circuit switched portion 101 of the UE 102. The S-CSCF 108 sends a SIP Acknowledgement message to the CCCF/NeDS 110 at event 174. At event 176, the media for the call start to be exchanged. The CCCF/NeDS 110 then sends a SIP Acknowledgement message to the S-CSCF 108 at event 178 and the S-CSCF 108 sends a SIP Acknowledgement message to the second MGCF/MGW 112 at event 180.

Figure 3:
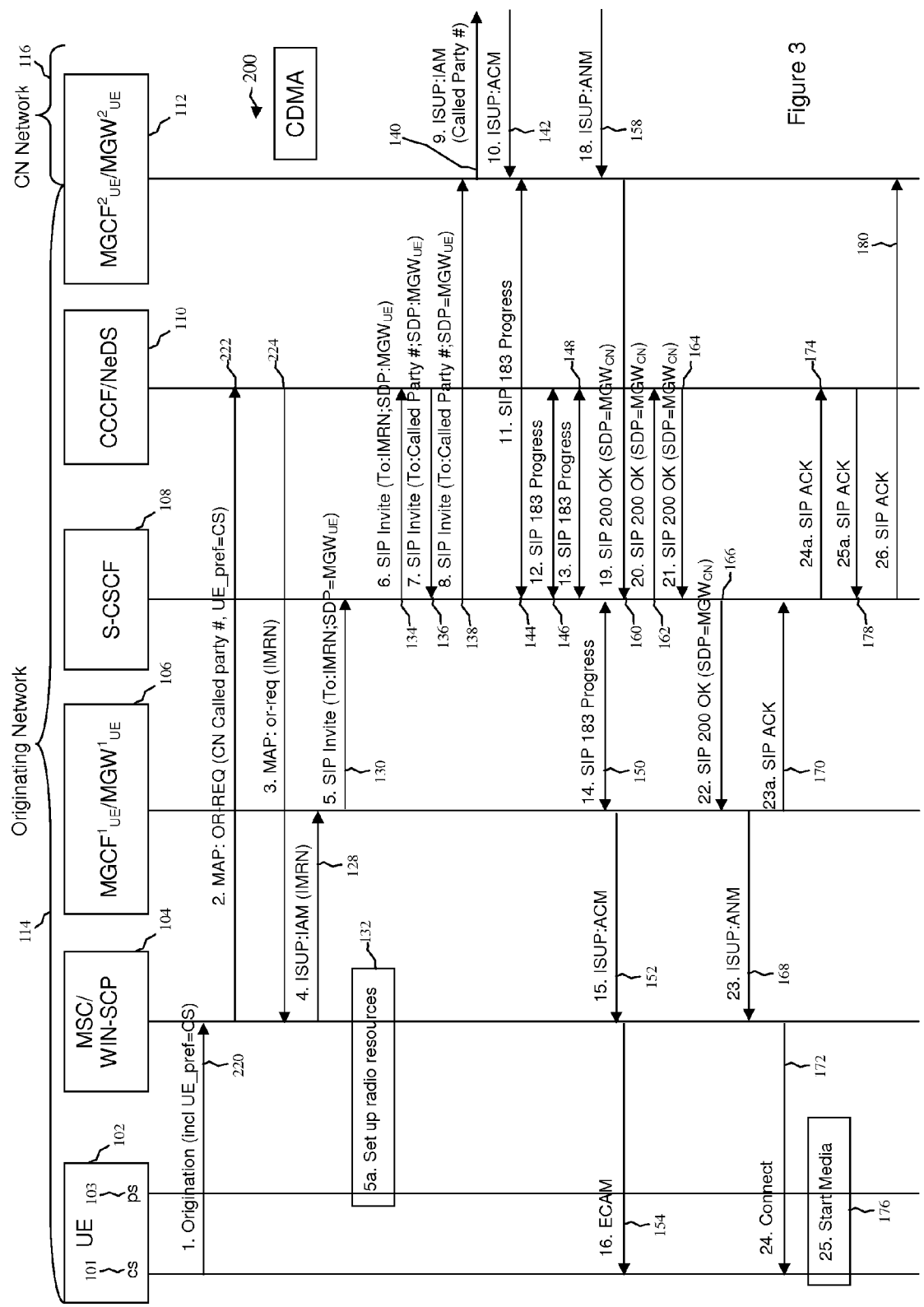
FIG. 3 is a call flow diagram for another call that is preferred to be initiated in the circuit switched domain according to an embodiment of the disclosure.

FIG. 3 is a call flow diagram 200 depicting another example of a series of events that might occur when a user specifies a preference for a call to be attempted in the circuit switched domain. In this case, the protocol that the technology selector 18 of FIG. 1 uses to attempt the call in the circuit switched domain is CDMA 1x, but other circuit switched protocols could be used in other situations. As in FIG. 2, the UE 102, the MSC 104, the first MGCF/MGW 106, the S-CSCF 108, and the CCCF/NeDS 110 can be considered part of the originating network 114 (the calling party's network). The called party might receive a call from the originating network 114 via the CN network 116.

In the embodiment of FIG. 3, the circuit switched portion 101 of the UE 102 initiates the call by sending a CDMA 1x Origination message to the MSC 104 at event 220. The CDMA 1x Origination message includes the user's specification that the circuit switched domain is preferred for the call. At event 222, the MSC 104 sends the CCCF/NeDS 110 a CDMA MAP message that also includes the user's preference for the circuit switched domain. At event 224, the CCCF/NeDS 110 sends the MSC 104 a CDMA Map message with an IMRN indicating that the call was successfully anchored in the CCCF/NeDS 110 and that the call was initiated in the circuit switched domain. The events that occur after the CDMA MAP message is sent in event 224 are similar to those described in regard to FIG. 2 and are well known to one of skill in the art and therefore will not be described again.

Figure 4:
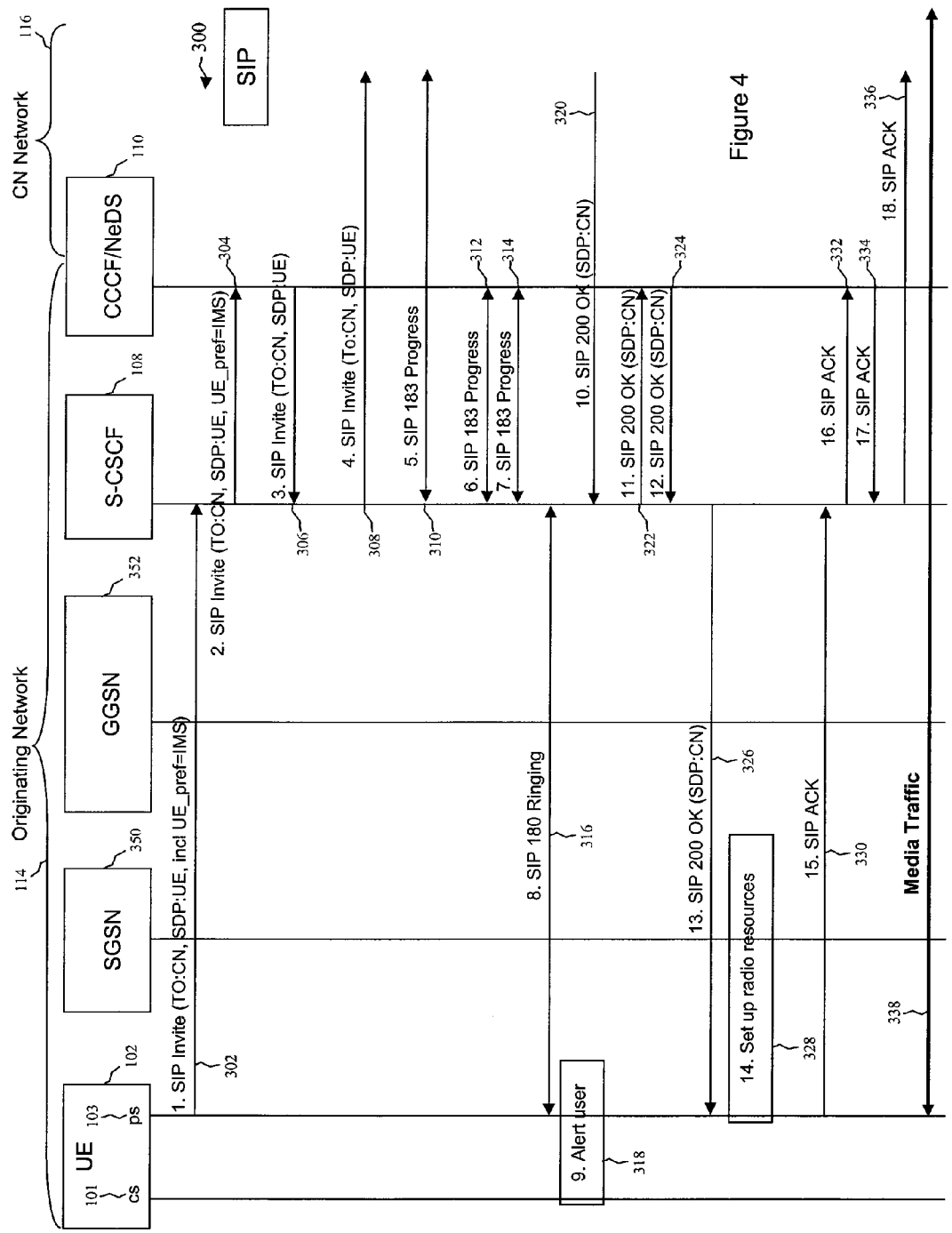
FIG. 4 is a call flow diagram for a call that is preferred to be initiated in the packet switched domain according to an embodiment of the disclosure.

FIG. 4 is a call flow diagram 300 depicting an example of a series of events that might occur when a user specifies a preference for a call to be attempted in the packet switched domain. In this case, the protocol that the technology selector 18 of FIG. 1 uses to attempt the call in the packet switched domain is SIP, but in other situations other packet switched protocols could be used. The originating network 114 includes the UE 102, the S-CSCF 108, and the CCCF/NeDS 110 and, in this case, also includes a serving GRPS support node (SGSN) 350 and a gateway GRPS support node (GGSN) 352. The CN network 116 might include other components not shown.

At event 302, the packet switched portion 103 of the UE 102 sends a SIP Invite message to the S-CSCF 108. The SIP Invite message includes the user's specification that the packet switched domain is preferred for the call. The S-CSCF 108 then sends a SIP Invite message to the CCCF/NeDS 110 at event 304. This SIP Invite message also includes the user's preference for the packet switched domain. At event 306, the CCCF/NeDS 110 sends a SIP Invite message to the S-CSCF 108. The S-CSCF 108 then sends a SIP Invite message to the CN network 116 at event 308. The S-CSCF 108 and the CN network 116 exchange a SIP Progress message at event 310. The S-CSCF 108 and the CCCF/NeDS 110 then exchange SIP Progress messages at events 312 and 314.

At event 316, a SIP Ringing message is sent from the S-CSCF 108 to the packet switched portion 103 of the UE 102, and the user is alerted at event 318. At event 320, the CN network 116 sends a SIP OK message to the S-CSCF 108. The S-CSCF 108 and the CCCF/NeDS 110 then exchange SIP OK messages at events 322 and 324. At event 326, a SIP OK message is sent from the S-CSCF 108 to the packet switched portion 103 of the UE 102. Radio resources are then set up for the call at event 328.

At event 330, the packet switched portion 103 of the UE 102 sends a SIP Acknowledgement message to the S-CSCF 108. The S-CSCF 108 and the CCCF/NeDS 110 then exchange SIP Acknowledgement messages at events 332 and 334. The S-CSCF 108 sends a SIP Acknowledgement message to the CN network 116 at event 336. Media traffic between the packet switched portion 103 of the UE 102 and the CN network 116 can then commence at event 338.

Figure 5:
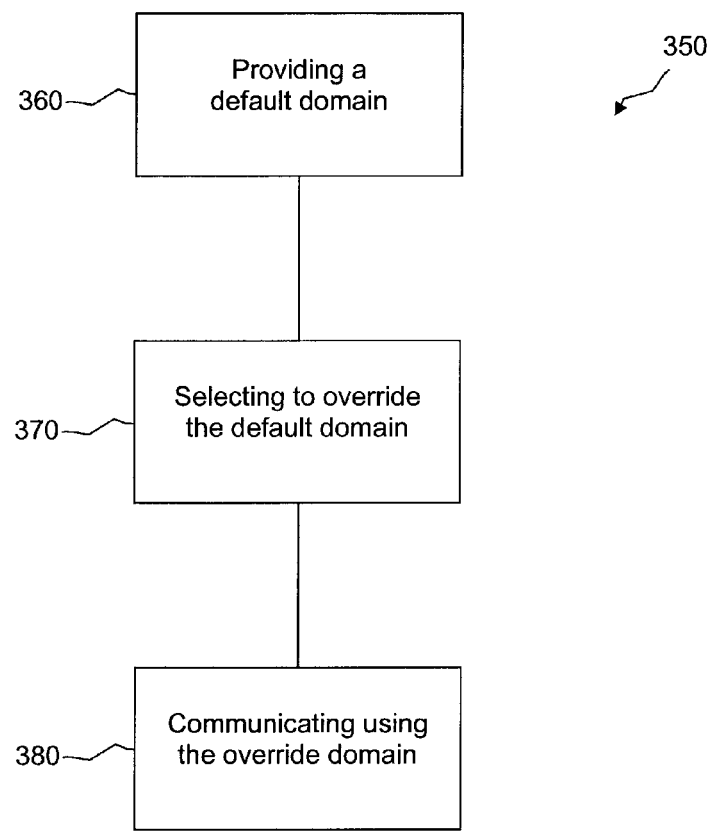
FIG. 5 is a diagram of a method for dynamically selecting a domain according to an embodiment of the disclosure.

FIG. 5 illustrates a method 350 for dynamically selecting a domain. At block 360, a default domain is provided. At block 370, a selection to override the default domain is made. At block 380, the override domain is used for communication.

Figure 6:
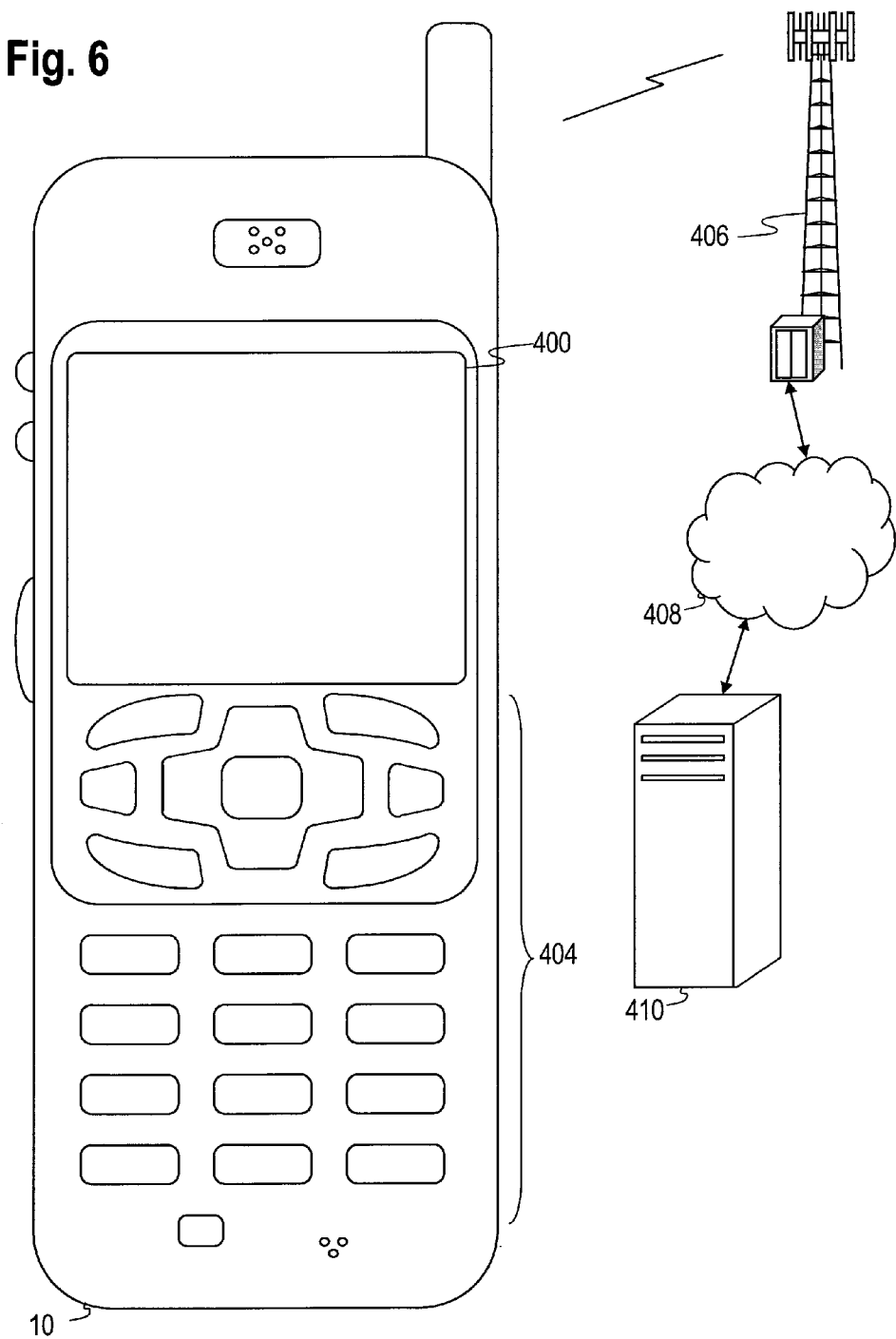
FIG. 6 is a diagram of a wireless communications system including a mobile device operable for some of the various embodiments of the disclosure.

FIG. 6 shows a wireless communications system including one embodiment of the mobile device 10. The mobile device 10 is operable for implementing aspects of the disclosure, but the disclosure should not be limited to these implementations. Though illustrated as a mobile phone, the mobile device 10 may take various forms including a wireless handset, a pager, a personal digital assistant (PDA), a portable computer, a tablet computer, or a laptop computer. Many suitable mobile devices combine some or all of these functions. In some embodiments of the disclosure, the mobile device 10 is not a general purpose computing device like a portable, laptop or tablet computer, but rather is a special-purpose communications device such as a mobile phone, wireless handset, pager, or PDA. In another embodiment, the mobile device 10 may be a portable, laptop or other computing device.

The mobile device 10 includes a display 400. The mobile device 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile device 10 may present options for the user to select (including the input component 15 to dynamically select an override domain for a particular call or session), controls for the user to actuate, and/or cursors or other indicators for the user to direct. The mobile device 10 may further accept data entry from the user, including numbers to dial or various parameter values for configuring the operation of the mobile device 10. The mobile device 10 may further execute one or more software or firmware applications in response to user commands. These applications may configure the mobile device 10 to perform various customized functions in response to user interaction.

Among the various applications executable by the mobile device 10 are a web browser, which enables the display 400 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the mobile device 10 has access to information on various servers, such as a server 410. The server 410 may provide content that may be shown on the display 400.

Figure 7:
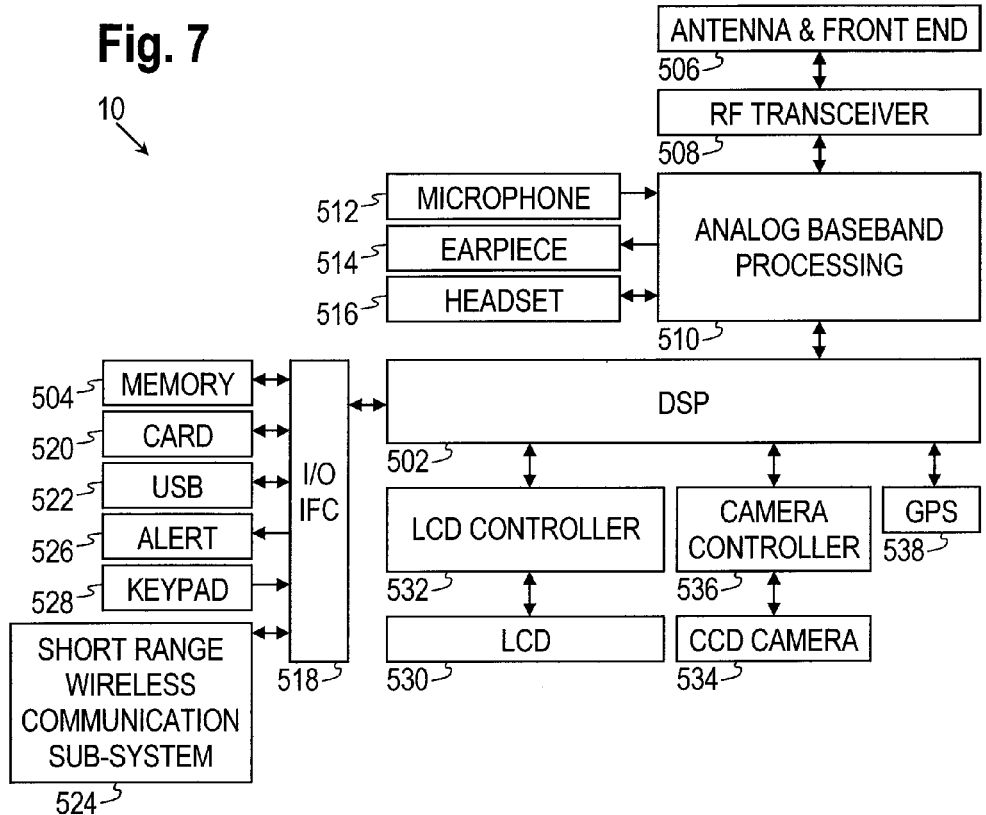
FIG. 7 is a block diagram of a mobile device operable for some of the various embodiments of the disclosure.

FIG. 7 shows a block diagram of the mobile device 10. The mobile device 10 includes a digital signal processor (DSP) 502 and a memory 504. As shown, the mobile device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the mobile device 10 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 10 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 10 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the mobile device 102 and may also enable the mobile device 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the mobile device 10 to communicate wirelessly with other nearby mobile devices and/or wireless base stations.

The input/output interface 518 may further connect the DSP 502 to the alert 526 that, when triggered, causes the mobile device 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the mobile device 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the mobile device 10 to take digital pictures. The DSP 502 communicates with the CCD camera 534 via the camera controller 536. The GPS sensor 538 is coupled to the DSP 502 to decode global positioning system signals, thereby enabling the mobile device 10 to determine its position. Various other peripherals may also be included to provide additional functions, e.g., radio and television reception.

Figure 8:
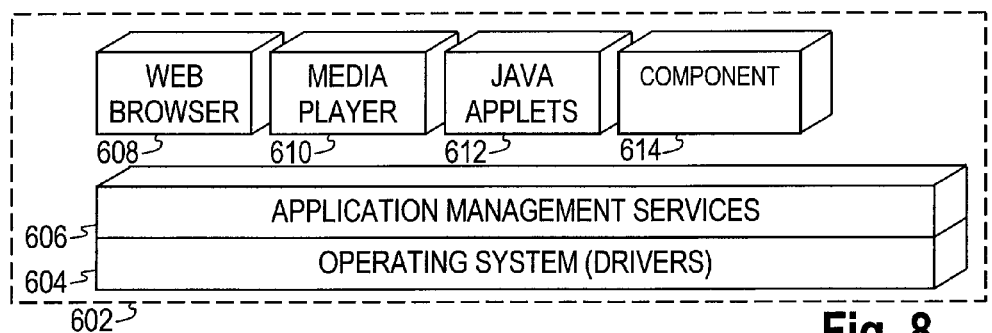
FIG. 8 is a diagram of a software environment that may be implemented on a mobile device operable for some of the various embodiments of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 10. Also shown in FIG. 8 are a web browser application 608, a media player application 610, and Java applets 612. The web browser application 608 configures the mobile device 10 to operate as a web browser, allowing a user to enter information into forms and select links to retrieve and view web pages. The media player application 610 configures the mobile device 10 to retrieve and play audio or audiovisual media. The Java applets 612 configure the mobile device 10 to provide games, utilities, and other functionality. A component 614 might provide functionality related to the selection of a domain and/or the selection of a network, protocol, or technology within a domain.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device configured for communication in both packet switched and circuit switched domains, comprising:
a domain selector configured, upon receipt of an incoming call via a first domain that is one of the packet switched and circuit switched domains, to determine, by the mobile device, a selection of a second domain in which to accept the incoming call, wherein the second domain is the other one of the packet switched and circuit switched domains other than the first domain, and wherein the domain selector is further configured to send the selection of the second domain to a technology selector; and
the technology selector configured to transmit a message, by the mobile device, responsive to the incoming call in the first domain to a network element via a wireless communications network, wherein the network element is capable of interpreting the message, the interpreting comprising determining that the incoming call will be established in the second domain and setting up, by the mobile device, the incoming call via the second domain.

2. The mobile device of claim 1, wherein the network technology selected by the technology selector is one of a WLAN, GPRS, WiMAX, and CDMA1x EV-DO technologies when the selected second domain is the packet switched domain.

3. The mobile device of claim 1, wherein the network technology selected by the technology selector is one of a CDMA 1x, UMTS, and GSM technologies when the selected second domain is the circuit switched domain.

4. The mobile device of claim 1, further comprising:
a user interface configured to identify the first domain and receive the selection of the second domain.

5. The mobile device of claim 4, wherein the user interface is further configured to provide information including at least one of cost and quality data about the first domain and the second domain.

6. The mobile device of claim 1, wherein the technology selector is further configured to determine whether the network accepts or rejects the selection of the second domain based upon network availability, and if the selection of the second domain is rejected by the network, automatically selecting the first domain.

7. The mobile device of claim 6, wherein network availability includes one of availability of network resources and network load balancing requirements.

8. The mobile device of claim 1, wherein the message is one of a Setup message or Invite message.

9. A method in a mobile device for selecting a communication domain, comprising:
receiving, at the mobile device, an incoming call via a first domain that is one of a packet switched and circuit switched domains;
determining, at the mobile device, a selection of a second domain in which to accept the incoming call, the second domain being the other one of the packet switched and circuit switched domains other than the first domain;
communicating, from the mobile device, a message responsive to the incoming call in the first domain to a network element via a wireless communications network, wherein the network element is capable of interpreting the message, the interpreting comprising determining that the incoming call will be established in the second domain;
setting up, at the mobile device, a new communications connection in the second domain.

10. The method of claim 9, further comprising:
indicating the first domain via a user interface as a default domain; and
providing an input component on the user interface to enable selection of the second domain as an override domain.

11. The method of claim 9, wherein said setting up the new communications connection in the second domain comprises:
if the second domain is unavailable, causing the incoming call to be established in the first domain; and causing a handover of the incoming call to the selected second domain upon moving to a geographic area where the selected second domain is available.

12. The method of claim 11, further comprising:
indicating the second domain is unavailable via a user interface; and
providing an input component on the user interface to enable confirmation to use the first domain.

13. The method of claim 9, wherein the first domain is a default domain associated with a connection preference, and wherein the selected second domain is different from the default domain.

14. The method of claim 9, wherein
communicating the message includes transmitting the selection of the second domain.

15. The method of claim 9, further comprising:
determining whether the wireless communications network has accepted or rejected the selection of the second domain; and
if the selection of the second domain is rejected by the wireless communications network, automatically selecting the first domain.

16. The method of claim 9, wherein the message is one of a Setup message or Invite message.

17. A method in a dual mode mobile device, comprising:
receiving an incoming call in a packet switched domain;
determining a selection at the dual mode mobile device to accept the incoming call in a circuit switched domain, wherein determining the selection occurs during an initialization of a communications connection responsive to receiving the incoming call;
transmitting a message used to indicate the selection of the circuit switched domain, wherein the message is transmitted to a network element configured to interpret the message and cause the incoming call to be established in the circuit switched domain; and
setting up a new communication connection for the incoming call in the circuit switched domain.

18. The method of claim 17, wherein determining the selection is based upon a preference configuration at the mobile device.

19. The method of claim 17, wherein the message is one of a Setup message or Invite message.

* * * * *